United States Patent
Karger et al.

[11] Patent Number: 5,673,634
[45] Date of Patent: Oct. 7, 1997

[54] INCINERATION PLANT WITH HEAT EXCHANGER

[75] Inventors: Robert Karger, Schwerte; Horst Rückert, Dortmund, both of Germany

[73] Assignee: Apparatebau Rothemühle Brandt & Kritzler GmbH, Wenden-Rothemühle, Germany

[21] Appl. No.: 428,211

[22] PCT Filed: Nov. 17, 1992

[86] PCT No.: PCT/EP92/02643

§ 371 Date: Jul. 14, 1995

§ 102(e) Date: Jul. 14, 1995

[87] PCT Pub. No.: WO94/11677

PCT Pub. Date: May 26, 1994

[51] Int. Cl.⁶ .................................. F23B 7/00
[52] U.S. Cl. .............. 110/234; 110/302; 60/39.182; 60/39.512; 122/1 C
[58] Field of Search ................ 110/203, 205, 110/345, 302, 304, 234, 306; 60/39.511, 39.512, 39.182; 122/1 R, 1 C

[56] References Cited

U.S. PATENT DOCUMENTS

| | | | |
|---|---|---|---|
| 4,739,713 | 4/1988 | Vier et al. | 110/345 X |
| 5,175,993 | 1/1993 | Raiko et al. | 60/39.182 X |
| 5,367,870 | 11/1994 | Vollmer | 60/39.182 |
| 5,435,123 | 7/1995 | Scholl et al. | 60/39.182 X |
| 5,509,264 | 4/1996 | Ito et al. | 60/39.182 X |

FOREIGN PATENT DOCUMENTS

| | | |
|---|---|---|
| 0148741 | 7/1985 | European Pat. Off. . |
| 0424864 | 5/1991 | European Pat. Off. . |
| 3346691 | 6/1985 | Germany . |
| 3505952 | 8/1986 | Germany . |
| 3539001 | 9/1986 | Germany . |
| 6-212909 | 8/1994 | Japan ............ 60/39.182 |

*Primary Examiner*—Henry A. Bennett
*Assistant Examiner*—Susanne C. Tinker
*Attorney, Agent, or Firm*—Friedrich Kueffner

[57] ABSTRACT

An incineration plant includes a heat exchanger arranged in a flue gas flow following a reduction stage for nitrogen oxides and in front of a flue gas dust collector, and a heat transfer medium circuit for absorbing heat from the heat exchanger in the flue gas flow. The heat exchanger is connected to the heat transfer medium circuit such that the heat transfer medium conducted in the circuit is admitted to the heat exchanger. The heat transfer medium circuit has at least one additional heat exchanger for absorbing heat from the heat transfer medium. A feed water preheater is arranged in the heat transfer medium circuit.

14 Claims, 2 Drawing Sheets

▢ Flue Gas Entry
⊙ Air Discharge
△ Scavenging Air Entry

INCINERATION PLANT WITH HEAT EXCHANGER

BACKGROUND OF THE INVENTION

1. Field of the Invention

The invention relates to an incineration plant with a heat exchanger for the return transfer of the flue gas waste heat. The heat recovery from the flue gases by means of such a heat exchanger usually has the purpose of preheating the combustion air required for the incineration plant and/or the boiler feed water of a steam producer heated by the incineration plant.

2. Description of the Related Art

Such incineration plants are equipped subsequently or when newly constructed with catalytic or non-catalytic reduction stages for the nitrogen oxides and with a flue gas desulfurization plant. For economical reasons, i.e., because of low efficiency losses and because of significantly lower investment costs, the catalytic or non-catalytic reduction stage for the nitrogen oxides is preferably arranged in the flue gas flow upstream of the heat recovery. This reduction stage is then also located upstream of a dust collector which is always required in incineration plants heated by coal.

In this arrangement, the low temperatures of the pipe walls of a feed water or condensate preheater arranged downstream of the reduction stage for the nitrogen oxide poses difficulties because deposits of ammonium bisulfate and dust occur on the heating surfaces due to the ammonia slippage present following the reduction stage or at the end of the steam producer and due to the sulfur oxides. These deposits are corrosive, reduce the heat transfer and lead to clogging. Therefore, the deposits must be removed by suitable methods. It is possible to remove the deposits by washing, however, the heat exchanger surfaces must be constructed accordingly.

In the case of a feed water preheater, another possibility of removing deposits from the heat exchanger heating surfaces is to empty the heat exchanger heating surfaces and to conduct hot flue gas or steam to the heat exchanger heating surfaces. In that case, the temperature of the flue gas or steam must be above the sublimation temperature of the ammonium salts. A boiler stoppage is also required in this case, wherein no information exists with respect to frequency and duration of the stoppage.

Finally, it is also possible to dimension the heat exchanger surfaces so large that, in spite of the deposits, the heat transfer is sufficient until a boiler stoppage which is usually necessary occurs. In that case, subsequently arranged heating surfaces would be required that are so large that such a construction would be uneconomical.

SUMMARY OF THE INVENTION

The invention is based on the object of providing an incineration plant with a heat exchanger in the flue gas flow, wherein the heat exchanger surfaces of the heat exchanger have a temperature at which an increased danger of deposits does not yet exist or which can be easily freed from the deposits and wherein the heat exchanger makes it possible to operate the heat exchanger for the return transfer of the waste heat in the flue gases to portions of the steam producer of the incineration plant at a very low temperature, without the danger of deposits and corrosion of these heat exchanger surfaces.

Starting from this object, in an incineration plant of the above-mentioned type, the invention proposes to arrange a heat exchanger in the flue gas flow following, for example, a catalytic reduction stage for nitrogen oxides and in front of a flue gas dust remover, to admit a circulated heat transfer medium to this heat exchanger for absorbing heat from the heat exchanger in the flue gas flow, and to arrange at least one heat exchanger in the heat transfer medium for absorbing heat from the heat transfer medium.

Since the heat transfer medium can be kept free of the components contained in the flue gases, such as, dust, ammonium sulfate and sulfur oxides, the second heat exchanger can be operated at very low pipe wall temperatures without producing the danger of falling below the dew point and the formation of ammonium bisulfate. The first heat exchanger in the flue gas flow can be easily constructed in such a way that it can be freed from the deposits which may occur at this heat exchanger; this can be effected with the methods described above, i.e., with water, with hot flue gas or with vapor.

The heat transfer medium used in the heat transfer medium circuit is preferably air because, in that case, no special arrangements must be made with respect to the tightness of the heat transfer medium circuit. However, it is also possible to use other fluids, preferably those which produce a low steam pressure even at higher temperatures of up to 300° C.

A feed water preheater arranged in the heat transfer medium circuit can serve for preheating the feed water because the heat exchanger in the flue gas flow is in a temperature range which is particularly suitable for this purpose. A condensate preheater which is operated at very low pipe wall temperatures can additionally be arranged in the heat transfer medium circuit downstream of the feed water preheater. This provides the possibility of preheating condensate with low entry temperature, producing advantages with respect to investment costs because of the smaller contact heating surfaces which conduct pressure.

It is particularly advantageous to arrange the incineration plant with its heat transfer medium circuit according to the invention in the flue gas flow of a combined gas turbine/steam turbine process. The steam producer required for the steam turbine process advantageously is fired with coal dust, wherein the oxygen required for the combustion is contained in the waste gases of the gas turbine operated with excess air. Accordingly, no additional combustion air or only little additional combustion air is required for firing the steam producer. For this reason, in conventional combined power plants, the subsequently arranged heating surfaces at the end of the boiler are constructed as contact heating surfaces, for example, as partial flow feed water preheaters. When the catalytic or non-catalytic reduction of nitrogen oxides in the flue gases is used, there is the danger of deposits on the heating surfaces which are composed predominantly of ammonium bisulfate; this is due to the low temperatures of the pipe walls and because of the ammonia slippage existing downstream of the catalyst or at the end of the steam producer and because of the sulfur trioxide. The previously known heating surfaces cannot be cleaned with water. In contrast, in the incineration plant according to the invention with a heat exchanger in the flue gas flow, a heat transfer medium circuit for absorbing heat from the heat exchanger in the flue gas flow and at least one heat exchanger in the heat circuit for absorbing heat from the heat transfer medium and for transferring heat to at least a portion of the incineration plant, for example, to a feed water preheater and/or a condensate preheater, there is a substantially reduced danger of deposits because the heat exchanger surfaces in the flue gas flow are structurally more suitable and do not reach temperatures which are as low as those of the heat exchanger surfaces of feed water preheaters or condensate preheaters arranged directly in the flue gas flow. In addition, the heat exchanger surfaces can be cleaned more easily.

If air is used as the heat transfer medium in the heat transfer medium circuit, there is the additional advantage that a partial flow of the heated air can be branched off and conducted to a coal dust mill and/or as additional combustion air to one or more burners of the steam producer.

It is a particular advantage to use a known regenerative heat exchanger, for example, a rotating Ljungström heat exchanger, as the heat exchanger in the flue gas flow because the heat exchanger surfaces rotate continuously and can be continuously cleaned, without requiring boiler stoppages, by means of dust blowers arranged on the flue gas side of the regenerative heat exchanger.

Such a dust blower can be constructed so as to be particularly effective if an air chamber is arranged on the flue gas side in front of a radial sealing means and if air from the heat exchanger circuit is admitted to the air chamber. The air chamber can be arranged on the hot side or on the cold side of the regenerative heat exchanger. By continuously admitting air to the air chamber, the flue gas volume present between the heating surfaces is completely displaced and, when the heating surface enters the heat transfer medium side (for example, air side), the flue gas cannot enter the heat transfer medium circuit and lead to contamination or deposits in the heat transfer medium circuit.

In addition, in order to prevent that flue gases containing pollutants can be dragged into the heat transfer medium circuit, a circulating blower can be arranged in the heat transfer medium circuit upstream of the regenerative heat exchanger, wherein the circulating blower serves to maintain the pressure on the air side above the pressure on the flue gas side of the regenerative heat exchanger. Slight leaks of the radial sealing means between the flue gas side and the air side of the rotating heat exchanger could then only cause air to flow from the heat transfer medium circuit into the flue gas flow. In addition, due to the excess pressure in the heat transfer medium circuit, air can be admitted in a simple manner to the air chamber from the heat transfer medium circuit through a branch line.

BRIEF DESCRIPTION OF THE DRAWING

The invention is explained in more detail below with the aid of an embodiment illustrated in the drawing. In the drawing.

DESCRIPTION OF THE PREFERRED EMBODIMENTS

Figure 1:
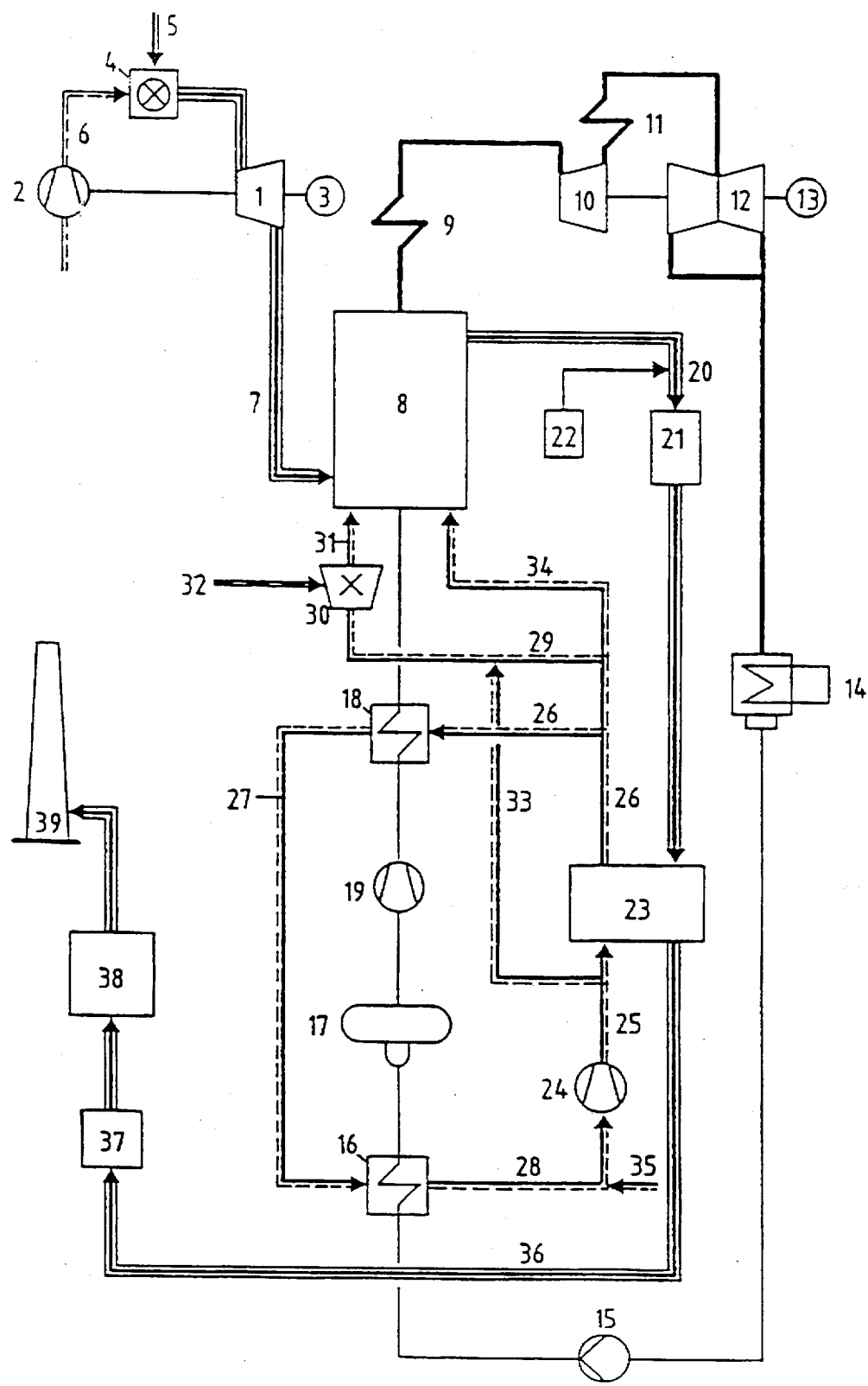
FIG. 1 is a schematic view of a combined power plant with the heat exchanger circuit according to the invention.
Figure 2:
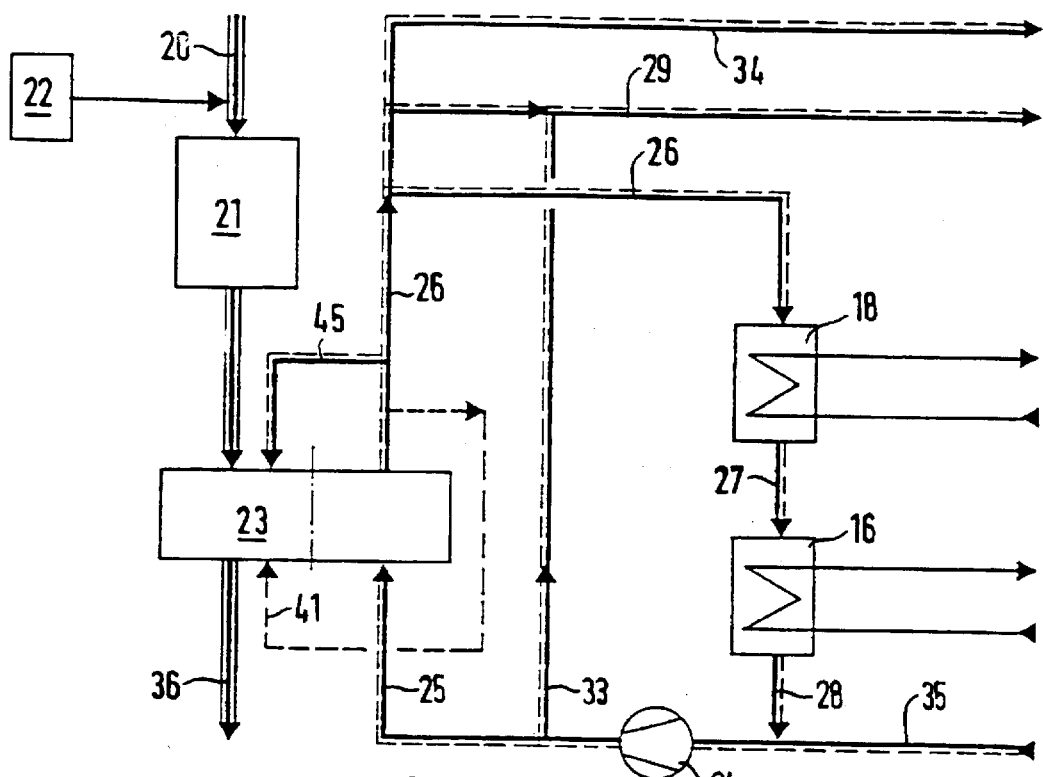
FIG. 2 is a schematic view, on a larger scale, of the heat exchanger circuit according to the invention.

The combined power plant includes a gas turbine 1 which drives a compressor 2 and a generator 3. The air arriving from the compressor 2 is conducted through a line 6 to a combustion chamber 4, wherein fuel gas or liquid fuel is fed into the combustion chamber 4 through a fuel supply 5. Since the combustion in the combustion chamber 4 must take place with a significant excess of air, in order to prevent the entry temperature of the gas turbine 1 from exceeding the permissible temperature, the turbine waste gases in the waste gas line 7 still contain significant quantities of residual oxygen. Therefore, the hot turbine waste gases can be conducted directly to the firing of a steam producer 8 and serve as oxygen carriers for the fuel supplied to the burner of the steam producer 8.

The steam produced in the steam producer 8 is conducted through a superheater 9 into a high pressure steam turbine 10 and is conducted from there through an intermediate superheater 11 to a double-flow low pressure steam turbine 12. The turbines 10, 12 drive another generator 13. The exhaust steam of the low pressure turbine 12 is conducted to a condenser 14, is condensed in the condenser 14 and is conducted by means of a condensate pump 15 through a condensate preheater 16 to a condensate tank 17. From the condensate tank 17, the condensate is conducted as boiler feed water through a feed water pump 19 and a feed water preheater 18 back to the steam producer 8.

The flue gases from the steam producer 8 are conducted through a flue gas line 20 through a catalytic or non-catalytic reduction stage 21 for nitrogen oxides. Ammonia from an ammonia tank 22 is supplied to the flue gas in the flue gas line 20. The flue gases are then conducted into a rotating regenerative heat exchanger 23 and from there through a flue gas line 36, a dust remover 37 and a flue gas desulfurization plant 38 into a chimney 39 and from there into the open.

The air side of the heat exchanger 23 is located in a heat transfer medium circuit composed of a circulating blower 24 and the air lines 25, 26, 27, 28. The feed water preheater 18 is arranged between the air lines 26, 27 and the condensate preheater 16 is arranged between the air lines 27, 28. Air is conducted through a branch 29 into a coal dust mill 30 and a coal dust and air mixture is conducted from the coal dust mill 30 through a line 31 to the steam producer 8. The coal dust mill 30 is connected to a coal supply 32.

Through a removal line 33 branching off in front of the heat exchanger 23, less heated air can be admixed to the air line 29, so that the temperature of the air conducted to the coal dust mill 30 can be adjusted. If the quantity of the oxygen conducted through the turbine waste gases through the line 7 to the firing of the steam producer 8 is not sufficient for the complete combustion of the supplied fuels, additional combustion air can be supplied to the firing through a line 34. The air supplied to the coal dust mill 30 and the steam producer 8 is replaced by a fresh air line 35 upstream of the circulating blower 24.

Figure 3:
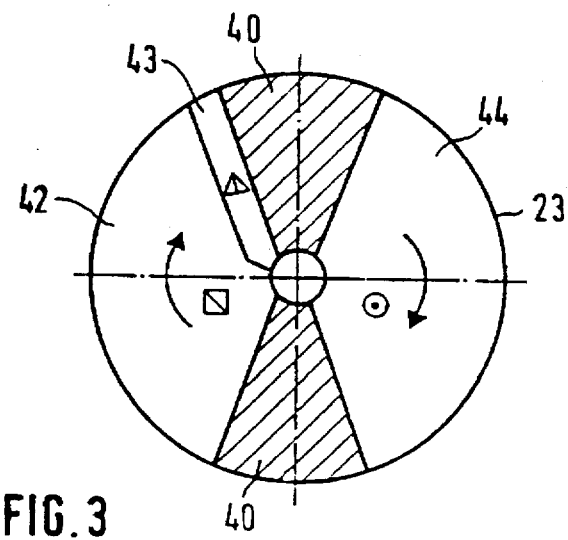
FIG. 3 is a schematic top view of a heat exchanger according to the invention.

As illustrated in FIG. 3, the regenerative heat exchanger 23 has radial sealing members 40 which separate the flue gas side 32 from the air side 34 of the heat exchanger 23. These radial sealing members 40 do not have to be completely tight, so that the manufacturing costs of the plant are reduced; this is because an excess pressure prevails in the heat transfer medium circuit 24, 25, 26, 27, 28, relative to the flue gas side 42 and, thus, a slight air flow exists from the air side 44 through the radial sealing members 40 to the flue gas side 42.

The heat exchanger surfaces of the heat exchanger 23 can be continuously freed from deposits by means of a dust blower in the form of an air chamber 43. This air chamber is arranged in rotating direction of the heat exchanger surfaces of the heat exchanger 23 immediately in front of one of the radial sealing members 40 on the flue gas side 42 and is supplied with air from the heat transfer medium circuit 24 to 28 through a scavenging air line 45. Deposits are blown off from the heat exchanger surfaces by means of this scavenging air. The scavenging air line 45 ends at the hot side of the heat exchanger 23, however, the air chamber can also be arranged on the cold side of the heat exchanger 23 and scavenging air can be admitted through a scavenging air line 41, shown in broken lines. The scavenging air can be obtained from the air line 25 upstream of the heat exchanger 23 as well as from the air line 26 downstream of the heat exchanger 23.

The invention can be used with advantage even in a conventional coal power plant with a catalytic or non-catalytic reduction stage following the steam producer and generally always in those cases in which there is the danger of deposits and corrosion. In addition, it is possible to circulate other fluids than air in the heat circuit, particularly those fluids which have a lower steam pressure even at higher temperatures of up to above 300° C.

We claim:

1. An incineration plant comprising a heat exchanger arranged in a flue gas flow following a reduction stage for nitrogen oxides and in front of a flue gas dust collector, a heat transfer medium circuit for absorbing heat from the heat exchanger in the flue gas flow, the heat exchanger being connected to the heat transfer medium circuit such that the heat transfer medium conducted in the circuit is admitted to the heat exchanger, the heat transfer medium circuit having at least one additional heat exchanger for absorbing heat from the heat transfer medium, further comprising a feed water preheater arranged in the heat transfer medium circuit.

2. The incineration plant according to claim 1, wherein the heat transfer medium is air.

3. The incineration plant according to claim 1, further comprising a condensate preheater arranged in the heat transfer medium circuit.

4. The incineration plant according to claim 1, wherein the heat transfer medium circuit is arranged in the flue gas flow of a combined gas turbine and steam turbine process.

5. The incineration plant according to claim 4, wherein the heat transfer medium circuit is arranged in the flue gas flow of a steam producer fired with coal dust.

6. The incineration plant according to claim 5, comprising means for branching off a partial flow of the heated air and conducting the partial flow to a coal dust mill.

7. The incineration plant according to claim 5, comprising means for branching off a partial flow of the heated air and conducting the partial flow as additional combustion air to one or more burners of the steam producer.

8. The incineration plant according to claim 1, comprising a regenerative heat exchanger in the flue gas flow.

9. The incineration plant according to claim 8, wherein the regenerative heat exchanger comprises one of a rotating heating surface or rotating flue gas hoods.

10. The incineration plant according to claim 9, comprising dust blowers arranged on a flue gas side of the regenerative heat exchanger.

11. The incineration plant according to claim 10, wherein the dust blower comprises an air chamber arranged on the flue gas side in front of a radial sealing means, such that air is admitted to the air chamber from the heat transfer medium circuit.

12. The incineration plant according to claim 11, wherein the air chamber is arranged on a hot side of the regenerative heat exchanger.

13. The incineration plant according to claim 11, wherein the air chamber is arranged on a cold side of the regenerative heat exchanger.

14. The incineration plant according to claim 9, comprising a circulating blower arranged in the heat transfer medium circuit upstream of the regenerative heat exchanger and comprising means for maintaining pressure on the air side above pressure on the flue gas side of the regenerative heat exchanger.

* * * * *